US008885929B2

(12) United States Patent
Ni et al.

(10) Patent No.: US 8,885,929 B2
(45) Date of Patent: Nov. 11, 2014

(54) ABNORMAL BEHAVIOR DETECTION SYSTEM AND METHOD USING AUTOMATIC CLASSIFICATION OF MULTIPLE FEATURES

(75) Inventors: Sze-Yao Ni, Taipei (TW); Yuang-Tzong Lan, Taipei (TW); Tom C. I. Lin, Taipei (TW); Yi-Wei Chen, Taipei (TW)

(73) Assignee: Gorilla Technology Inc., Taipei (TW)

( * ) Notice: Subject to any disclaimer, the term of this patent is extended or adjusted under 35 U.S.C. 154(b) by 202 days.

(21) Appl. No.: 12/955,049

(22) Filed: Nov. 29, 2010

(65) Prior Publication Data

US 2012/0134532 A1 May 31, 2012

(30) Foreign Application Priority Data

Jun. 8, 2010 (TW) .............................. 99118536 A

(51) Int. Cl.
*G06K 9/62* (2006.01)
*G06K 9/00* (2006.01)
*G08G 1/017* (2006.01)

(52) U.S. Cl.
CPC .......... *G06K 9/00785* (2013.01); *G08G 1/0175* (2013.01)
USPC ......................................................... 382/159

(58) Field of Classification Search
USPC .................. 382/158, 159, 190, 209
See application file for complete search history.

(56) References Cited

U.S. PATENT DOCUMENTS

| | | | | |
|---|---|---|---|---|
| 6,950,789 B2 * | 9/2005 | Laird et al. | .......................... | 703/8 |
| 6,985,827 B2 * | 1/2006 | Williams et al. | .............. | 702/142 |
| 2008/0031491 A1 * | 2/2008 | Ma et al. | ......................... | 382/103 |
| 2008/0193010 A1 * | 8/2008 | Eaton et al. | .................... | 382/159 |
| 2011/0205359 A1 * | 8/2011 | Lee et al. | ....................... | 348/143 |
| 2012/0041575 A1 * | 2/2012 | Maeda et al. | ................... | 700/80 |

OTHER PUBLICATIONS (Dong, N, "Traffic Abnormality Detection through Directional Motion Behavior Map", 2010, IEEE International Conference on Advanced Video and Signal Based Surveillance).*
(Ermis, Erhan, "Motion Segmentation and Abnormal Behavior Detection via Behavior Clustering", 2008, ICIP 2008).*
(Hernandez, Hugo, "Detecting Abnormal Vehicular Dynamics at Intersection Based on an Unsupervised Learning Approach and a Stochastic Model", Aug. 2010, Sensors).*
(Adhiya, K.P., "Tracking and Identification of Suspicious and Abnormal Behaviors Using Supervised Machine Learning Technique", 2009, International Conference on Advances Computing Communication and Control (ICAC3'09)).*

(Continued)

*Primary Examiner* — Stephen R Koziol
*Assistant Examiner* — Totam Le
(74) *Attorney, Agent, or Firm* — Min-Lee Teng; Litron Patent & Trademark Office

(57) ABSTRACT

Described herein are a system and a method for abnormal behavior detection using automatic classification of multiple features. Features from various sources, including those extracted from camera input through digital image analysis, are used as input to machine learning algorithms. These algorithms group the features and produce models of normal and abnormal behaviors. Outlying behaviors, such as those identified by their lower frequency, are deemed abnormal. Human supervision may optionally be employed to ensure the accuracy of the models. Once created, these models can be used to automatically classify features as normal or abnormal. This invention is suitable for use in the automatic detection of abnormal traffic behavior such as running of red lights, driving in the wrong lane, or driving against traffic regulations.

17 Claims, 7 Drawing Sheets

(56) References Cited

OTHER PUBLICATIONS (Frederic Cupillard, "Tracking Groups of People for Video Surveillance", 2001; CiteSeer).*

(Weiming Hu, "A Survey on Visual Surveillance of Object Motion and Behaviors", 2004, IEEE Transactions on Systems, MAN and Cybernetics—Part C: Applications and Reviews, vol. 34, No. 3).*

* cited by examiner

ABNORMAL BEHAVIOR DETECTION SYSTEM AND METHOD USING AUTOMATIC CLASSIFICATION OF MULTIPLE FEATURES

BACKGROUND OF THE INVENTION

1. Field of the Invention

The invention is related to an automatic abnormal behavior detection system that regards the detection problem as a two-category classification problem based on multiple features. More particularly, the invention can be applied to abnormal traffic event detection with image analysis techniques.

2. Description of Related Art

Abnormal behavior refers to unusual or statistically rare behavior. The purpose of abnormal behavior detection is to find out whether any subject, has behaved in a manner that suggests abnormality. For example, a pedestrian or a vehicle violates the traffic regulation. Abnormal behavior detection is one of the sub-topics of automatic video information searching and content analysis. Main applications of abnormal behavior detection including, extraordinary intrusion detection, safety watching of home elders, security monitoring of neighborhood alleys, etc.

In conventional systems, the detection of abnormal behavior usually identifies a specific abnormal behavior just based on a single feature. For example, in extraordinary intrusion detection, motion information is extracted from the video and used to be reference for determining whether an object's movement complies with the normal trajectory. If the detected trajectory deviates from the normal one, the associated behavior is identified as an abnormal behavior. However, in reality, the abnormal behavior or any violation instance always needs more than one description of a feature to verify the presence of the associated violated behavior. Therefore, collection of some meaningful features can be used to enhance the detection of abnormal behavior and broaden its applications.

Abnormal behavior detection has a wide range of applications. In the field of traffic regulation, an abnormal behavior is regarded as traffic violation event. Therefore, abnormal behavior detection is reasonably applicable to traffic violation detection. Currently, red light running events are detected by the underground inductive loops in the roadway which are connected with traffic signals. When a vehicle passes through an intersection under the region of surveillance during the red light phase of the traffic signals, the capture equipment, such as a camera or a recorder, can be triggered to capture the violation evidence as the vehicle passing through. However, the conventional detection scheme requires high costs in time and money for construction and maintenance due to the costs of installing and maintaining for the underground inductive loops.

SUMMARY OF THE INVENTION

Unlike the conventional behavior detection system, the main feature of present invention is that only a camera is required to take the road monitoring image, but no inductive loops need to be buried in the roadway. It particularly reduces the cost of construction and maintenance.

The machine learning mechanism based on multiple features is adopted in our invention for detecting abnormal behaviors automatically. With multiple application-oriented features, the system differentiates itself from its conventional counterpart—it is capable of detecting abnormal behaviors in complex traffic regulations systems or in various environments. It is worth attention that the system does not need to set any condition when being applied in different environments, and this advantage significantly enhances the applicable scope and practicability.

The system according our invention essentially utilizes image analysis and pattern recognition techniques to extract various features of each object from captured images. Rely on the techniques of machine learning, the behaviors of the monitored objects can be classified into several groups and the associated behavior models are established. If the probability of a specific observed behavior is lower than a predetermined threshold; the observed behavior would be regarded as an abnormal behavior. Based on this concept, the proposed invention can determine whether a behavior is abnormal after a learning period, thus the abnormal behavior event can be detected whenever it happened. Furthermore, in order to reduce misclassification, a supervised learning method can be further incorporated to the invention.

The present invention is applicable to red light running detection, without any limit of the complexity of traffic signals system. By comparing the feature set of the observed behavior with the behavior model, the system can identify the abnormal behavior events. Furthermore, to reduce the misclassification, a supervised machine learning scheme can be incorporated into the claimed system, (i.e. manually set the type of some specific normal/abnormal behaviors).

The abnormal behavior detection system can be adapted to detect the traffic violations such as red light running, failed to use designated lane, driving in the wrong lane, and wrong-way driving. By means of extracting multiple different features from the captured images, the claimed system is applicable to other abnormal behavior detections, for example, zone intrusion detection and train track intrusion detection.

These and other various advantages and features of the instant disclosure will become apparent from the following description and claims, in conjunction with the appended drawings.

DETAILED DESCRIPTION OF THE PREFERRED EMBODIMENTS

Figure 1:
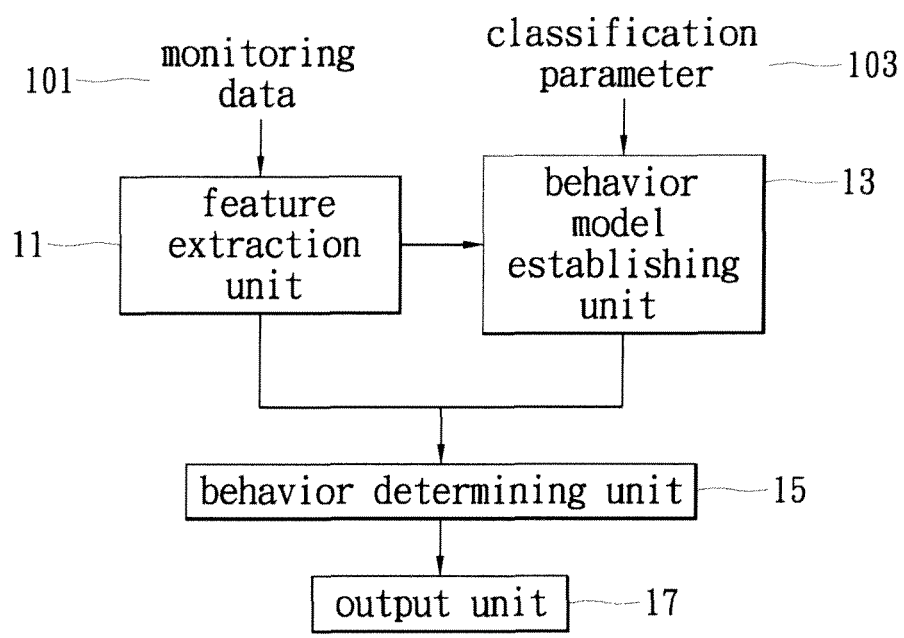
FIG. 1 shows the architecture of an embodiment of the present invention.

Reference is firstly made to FIG. 1, illustrating the architecture of present invention. The current embodiment including a feature extraction unit 11, a behavior model establishing unit 13, a behavior determining unit 15, and an output unit 17. The feature extraction unit 11 is used to extract multiple distinctive features from monitoring data 101, and then features which are belong to the same object are grouped into a feature set.

The feature set consists of one or more object features and environmental features which are extracted from where the object is in. The behavior model establishing unit 13 refers to the classification parameter which set as requirement 103 and performs cluster analysis on the feature sets extracted by the feature extraction unit 11 based on their similarities, and then establish a new behavior model(s) or update the existed model(s) through a learning process.

After one or more behavior models are established, the behavior determining unit 15 then determines if an object's behavior belongs to any type of abnormal behavior by comparing the feature sets of object with the behavior models. At last, the output unit 17 outputs the behavior model constructed by the behavior model establishing unit 13, and behavior type classification results are outputted by the behavior determining unit 15.

Figure 2A:
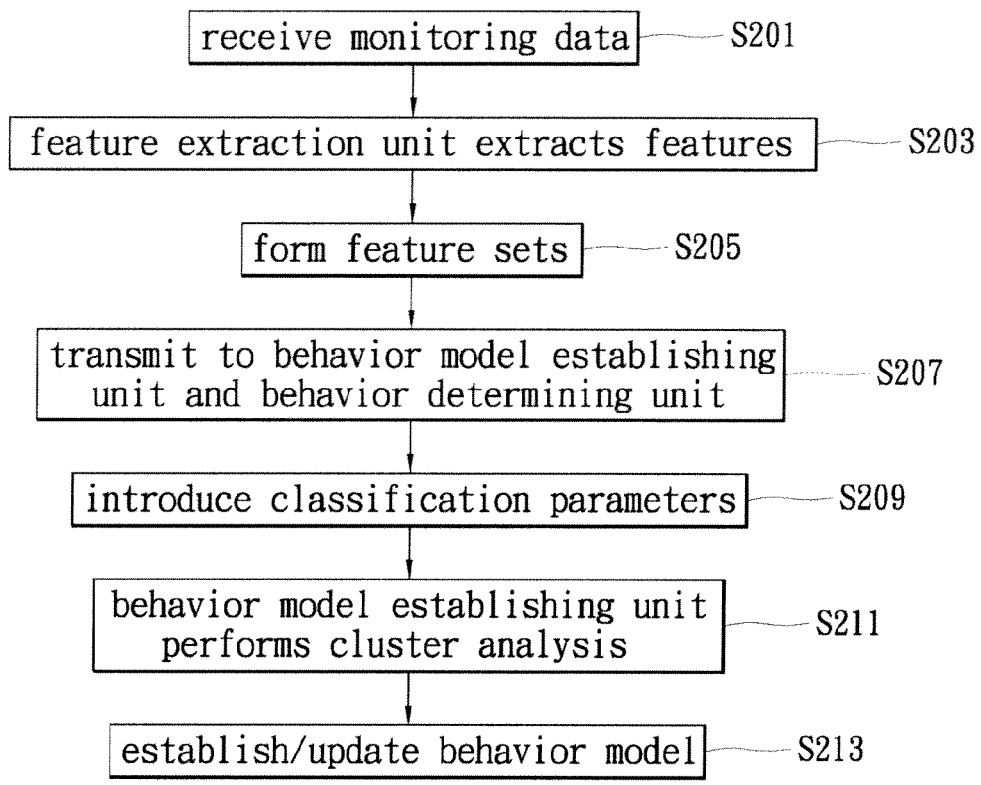
FIG. 2A illustrates the flow chart of establishing a behavior model in the method of abnormal behavior detection in accordance with the present invention.

In one embodiment, further reference is made to FIG. 2A, the flow chart of behavior model establishment process in the invention. Firstly, the system receives the monitoring data from one or more sensors installed in the environment under surveillance (step S201). The feature extraction unit 11 then extracts the features of each object and their associated environmental features (step S203). Those features are buffered in a memory.

Due to the various types of incoming monitoring data, the feature extraction unit 11 extracts the necessary features for each single object and these features related to the same object are formed a feature set (step S205). All feature sets are buffered in the memory. The feature sets are transmitted to the behavior model establishing unit 13 and the behavior determining unit 15 (step S207). The behavior model establishing unit 13 performs cluster analysis and establishes the behavior model, and then the behavior determining unit 15 determines the presence of abnormal behavior.

The behavior model establishing unit 13 can introduces the classification parameters 103 (step S209) and performs cluster analysis on all the feature sets obtained from the feature extraction unit 11 based on their similarity (step S211). The behaviors of the plurality of objects are divided into several groups after the cluster analysis; as a result, after cluster analysis, the objects in the same group may have similar environmental features, trajectories, spatial characteristics, or object features. Furthermore, the system establishes the associated behavior model base on the clustering result.

After that, the behavior model establishing unit 13 establishes and updates the behavior model (step S213) by a machine learning method. The behavior model is a collection of the feature sets of a plurality of object's behaviors over a period of time. Because the behavior model consists of the corresponding feature sets with respect to each behavior, it can serve as a behavior model database and be used in further behaviors classification. The flow chart illustrated in FIG. 2A depicts the procedures which can continuously work during the operation. A new behavior model can be established or the existing one which is buffered in the memory or in a database can be updated at any time instance.

Figure 2B:
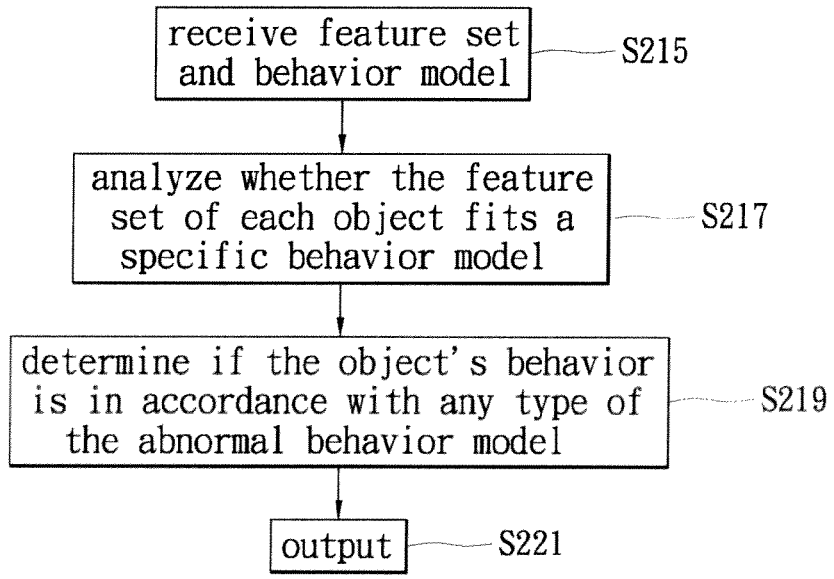
FIG. 2B illustrates a work flow of determining abnormal behavior using the method of the abnormal behavior detection in accordance with the present invention.

Further reference is made to FIG. 2B, illustrating the work flow of abnormal behavior detection. The behavior determining unit 15 firstly receives the feature sets from the feature extraction unit 11 and the behavior model from the behavior model establishing unit 13 (step S215). Next, the feature set of each object is compared with all the behavior models to determine if the object behaved abnormally. The objects behavior is regarded as abnormal when its feature set fits with any abnormal behavior or fits none of normal behavior model (step S219). After that, the type of object behavior determined by the behavior determining unit 15 is sent to the output unit 17. The output unit 17 then outputs the determination result (step S221).

In one of the embodiments, the sensor can be a digital camera, a still camera, and other kinds of sensors. The monitoring data generated from the sensors including traffic signal status, monitored image, or other distinctive feature data, which can be extracted by the feature extraction unit 11.

In the case of taking the traffic signal status as monitoring data, the system can be connected with the traffic signal via a signal cable, and the feature extraction unit 11 may directly take the real-time traffic signal status as an environmental feature. In the case of surveillance video, the feature extraction unit 11 extracts all distinctive features and continuously-changed behaviors of an extracted object from the image sequence by various image analysis techniques. The region for feature extraction can be either predetermined manually, or automatically extracted by some image analysis techniques. In a preferred embodiment, the distinctive features in a monitoring image may be the status of traffic signal, the status of warning light signal, or object type. The continuously-changed behavior of the object can be the trajectory type of an object such as standing, stopping or moving.

In the present embodiment of the invention, the feature extraction unit groups object-related features (e.g. position and trajectory of the object), and object-unrelated environmental features (e.g. traffic light status) into the feature set.

In one embodiment, the behavior model establishing unit 13 uses unsupervised learning method. The unit 13 performs cluster analysis on the feature sets extracted by the feature extraction unit 11 based on the similarity among them. As a result, the behaviors with similar feature sets are classified into the same group. The behavior establishing unit 13 establishes one or more behavior models by analyzing the result of cluster analysis. For example, a behavior is associated with a normal behavior model due to its high frequency; in the contrary, a rare behavior is associated with an abnormal behavior model. In another embodiment, the mentioned behavior model establishing unit 13 can be supervised, the model is established according to some supervised classification parameter. Therefore, the abnormal behaviors can be clearly defined.

Next, the output unit 17 can be a storage device, a display, a transmitter, or any combination of any number of these devices. The objectives of the system are for real time alarm, or store the abnormal events for further citation.

Furthermore, the claimed detection system is applicable to the various applications of abnormal behavior detections, such as home security monitoring, security monitoring of neighborhood alleys, and traffic violation monitoring. Hereinafter an example of red light running is provided.

Figure 3:
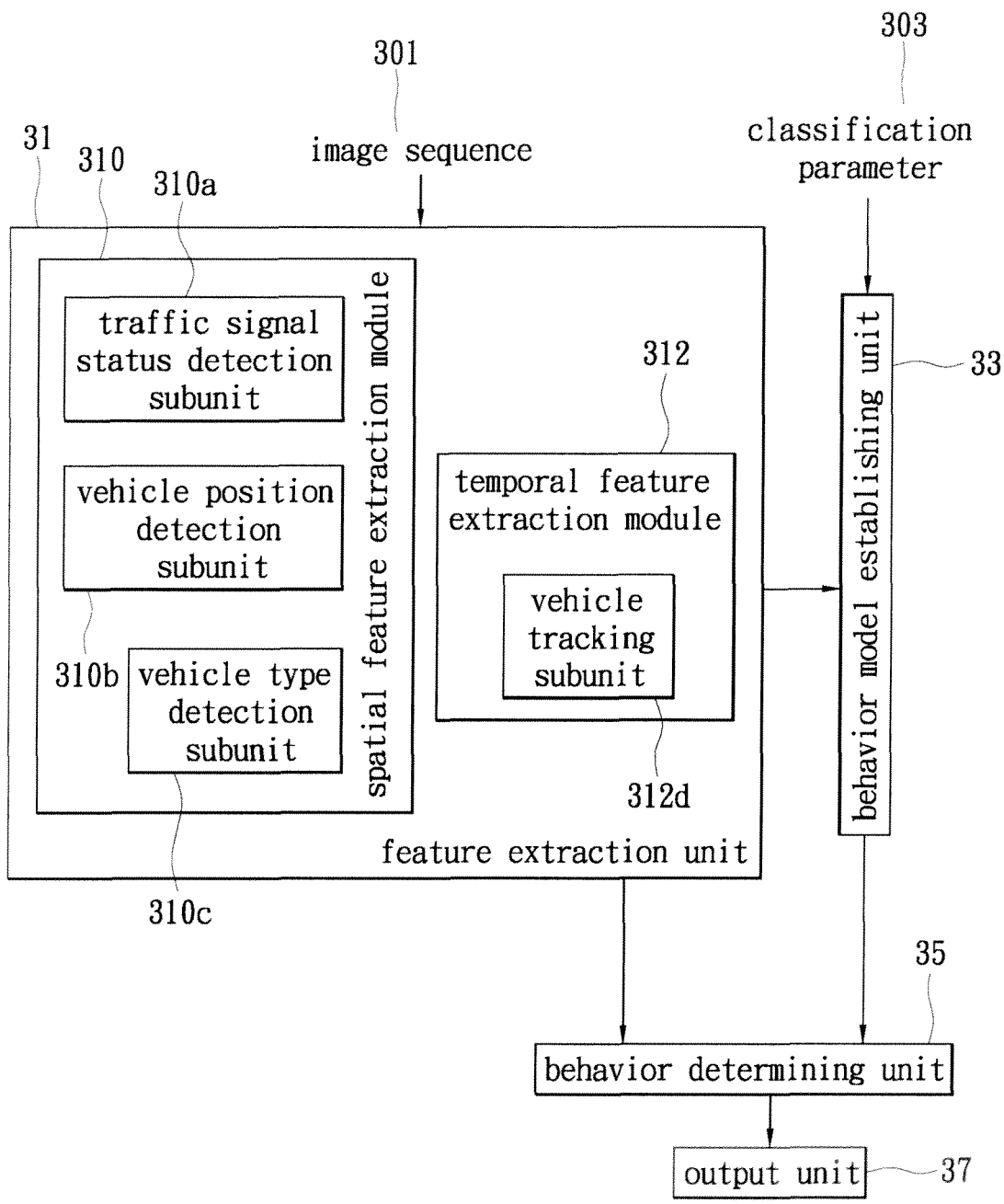
FIG. 3 describes an embodiment of the method of abnormal behavior detection using the automatic classification of multiple features for detecting the violated red light running.

Further reference is made to FIG. 3, which shows the embodiment of the proposed detection system adapted to the red light running detection. In the detection system, a feature extraction unit 31 includes a spatial feature extraction module 310 used for handling spatial features, and a temporal feature extraction module 312 used for dealing with temporal features. The spatial feature extraction module 310 further including a traffic signal status detection subunit 310a, a vehicle position detection subunit 310b, and a vehicle type detection subunit 310c. Furthermore, the temporal feature extraction module 312 includes a vehicle tracking subunit 312d.

Figure 4:
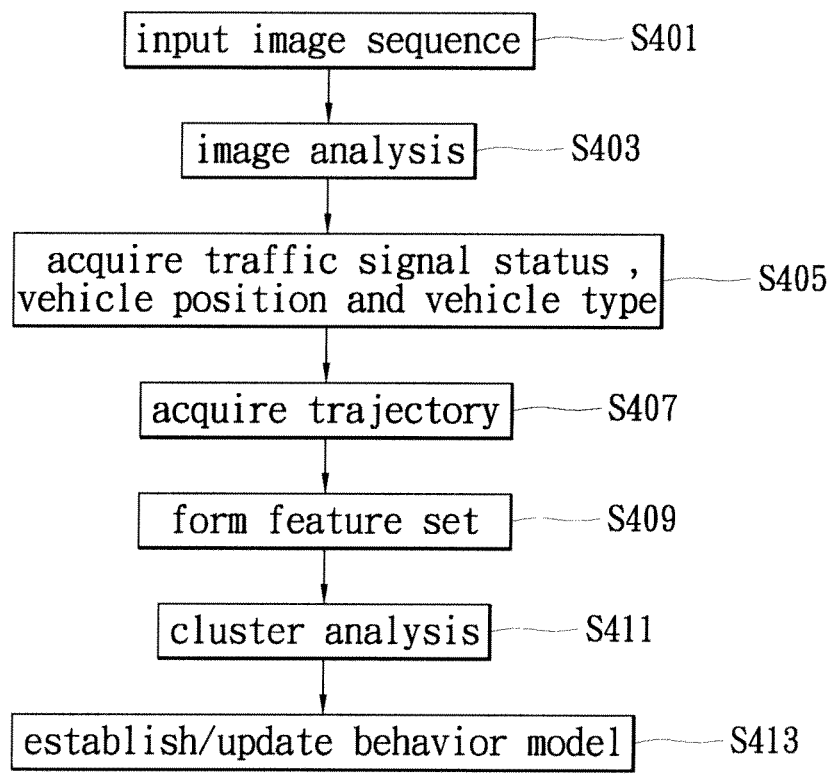
FIG. 4 illustrates a flow chart of establishing the behavior model for detecting the behavior of traffic violation event of the embodiment in accordance with the present invention.

Reference is made to a flow chart illustrated in FIG. 4 in view of FIG. 3. The flow chart illustrates a method for establishing the behavior model.

The detection system, which is capable of detecting red light running event, firstly, the image sequence 301 generated from the monitoring environment is inputted to the feature extraction unit 31 (step S401) and then the spatial feature extraction module 310 and the temporal feature extraction module 312 extract the spatial and the temporal features from the image sequence 301 by some image analysis techniques (step S403), respectively. At meanwhile, traffic signal status detection subunit 310a, vehicle position detection subunit 310b, and vehicle type detection subunit 310c also obtain the detection results.

After feature extraction, current status of the traffic signal and the positions of one or more vehicles are obtained. Furthermore, the type of each vehicle can be recognized by its shape and size, the type of a vehicle can be bus, sedan, truck, or motorcycle which has different shapes and sizes (step S405). The vehicle tracking subunit 312d in the temporal feature extraction module 312 can extract the trajectory of a specific vehicle by analyzing the distribution of the vehicle's positions over a period of time (step 407).

More particularly, the feature extraction unit 31 may group the extracted features into a feature set (step S409). The obtained feature set is then transferred to the behavior model establishing unit 33 and the behavior determining unit 35. After that, the behavior model establishing unit 33 performs a cluster analysis (step S411), and establishes a new behavior model or updates the existed behavior model (step S413). The behavior determining unit 35 finally determines whether the behavior of observed object is abnormal.

In the current embodiment, the behavior model establishing unit 33 receives the feature set(s) obtained by the feature extraction unit 31, and then the supervised feature cluster analysis is performed on each feature set by referring the supervised classification parameters (303). The objects belong to the same group have similar features such as environmental feature, trajectory, spatial feature, or object feature. According to one embodiment, the feature sets may be, but not limited to, categorized into: (1) vehicle proceed straight during green light phase; (2) vehicle stops during red light phase; and (3) vehicle proceed straight during red light phase. According to the clustering result, the behavior model establishing unit 33 then establishes and continuously updates the behavior model(s) of the object using machine learning method.

Besides the introduction of supervised classification parameters (303), in one preferred embodiment, the behavior model establishing unit 33 may employ an unsupervised learning method to perform the cluster analysis on each object's behavior based on the similarity among feature set. After that, the behaviors of the plurality of objects are divided into a plurality of groups. According to the probability distribution of groups, the groups with the probability higher than a threshold are regarded as the normal behavior. Therefore, a normal behavior model is established based on the associated feature sets. On the contrary, the groups with the probability lower than the threshold are regarded as the abnormal behavior, and an abnormal behavior model is then established. The mentioned threshold can be set manually in advance, or be automatically acquired through a learning process. These behavior models established by the behavior model establishing unit are transmitted to the behavior determining unit, and be used for abnormal behavior determination.

The behavior determining unit 35 performs a comparison between the observed object's feature set and the behavior models. If the feature set is in accordance with any normal behavior model, the behavior of the object is regard as normal. On the contrary, if the object's feature set does not fit with any normal behavior model, or fit with any abnormal behavior model, the object's behavior is regarded as abnormal. The result of the determination is then transferred to the output unit 37, and the result is outputted or stored in a memory by the output unit 37.

In one embodiment, various image analysis techniques are used to acquire the status of traffic signal. However, in another embodiment, the traffic light signal status is obtained by directly connecting the system and the signal light device via a signal cable.

Figure 5:
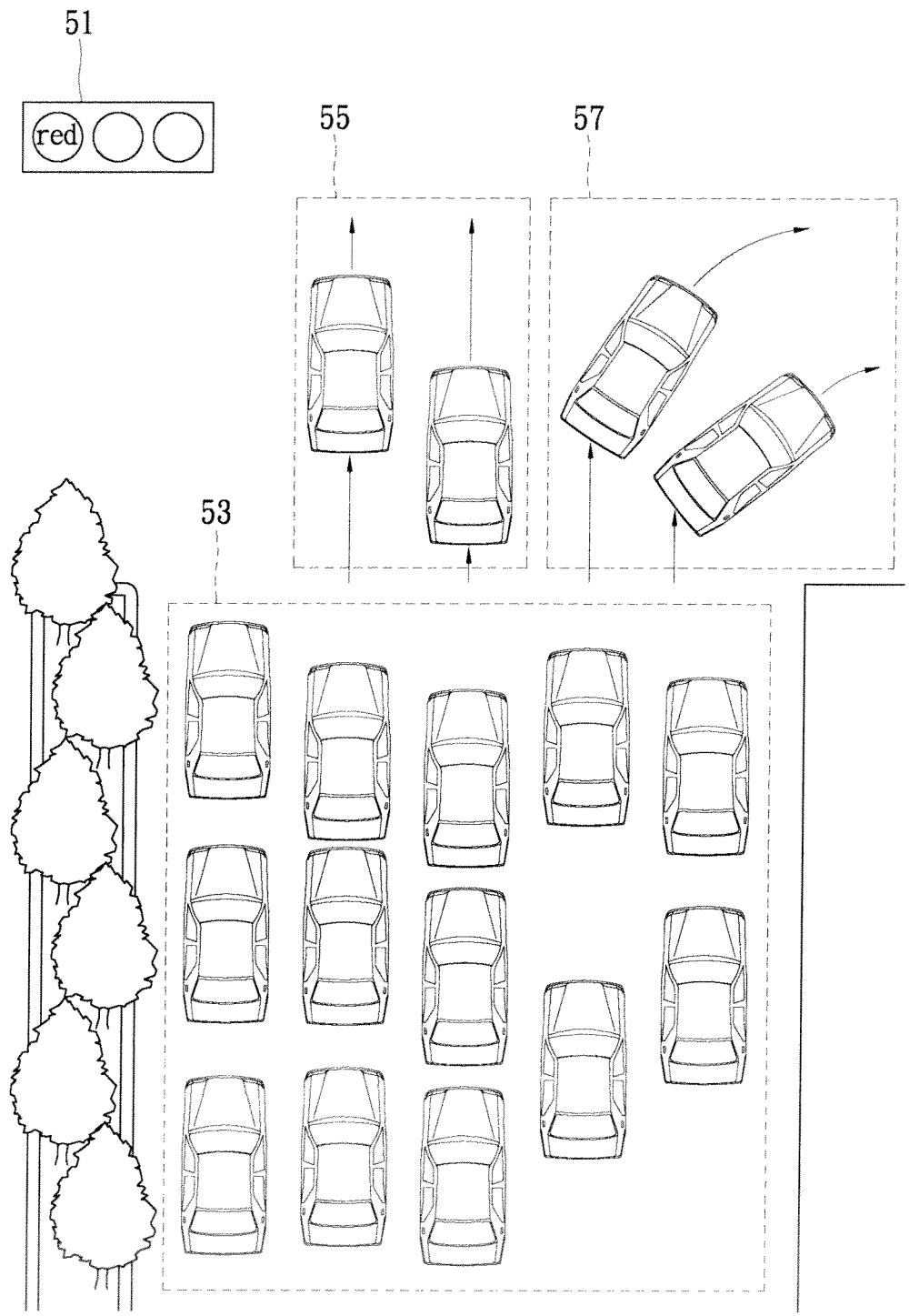
FIG. 5 schematically shows a diagram of detection of red light running in one embodiment of the present invention.

Reference is made to FIG. 5 showing the further explanation of applying the claimed system to red light running detection. In this embodiment, a traffic signal 51 with at least three statuses (i.e. red, yellow, and green installed at an intersection. Herein, the traffic signal 51 is in red light phase.

The status of "a vehicle approaching an intersection" consists of multiple features. In this embodiment, when the status of a traffic signal obtained by the feature extraction unit is "Stop" (red light), the clustering result from the behavior model establishing unit can be summarized as the following groups. The first group (53) is "the vehicle stops behind the intersection while the signal status is Stop (red light)". The second group (55) is "the vehicle proceeds straight through the intersection while the signal status is Stop (red light)". The third group (57) is "the vehicle proceeds turning right while signal status is Stop (red light)".

The behavior model establishing unit performs cluster analysis and obtained the probability distribution of the clustered groups. The result shows that most of vehicles will stop behind the intersection while the signal status is red, and the associated behaviors are classified as the first group (53). Since the behaviors in the first group (53) have high probability, the behavior model establishing unit will classify this group as normal behavior group. Even though the signal status is "Stop", behaviors of the second group (55) and the third group (57) are still observed but only occur in a low probability. Therefore, these groups (55, 57) are classified as abnormal behavior groups due to their low probabilities.

The behavior determining unit compares the feature set of the detected object with the behavior models established by the behavior model establishing unit. If the feature set of a specific object is in accordance with any normal behavior model (i.e. the models of the first group (53) in above example), the behavior determining unit will determine that this object conducts a normal behavior. If the feature set of object does not accord with any normal behavior model, or it complies with any abnormal behavior model (i.e. the models of the second group (55) or the third group (57)), the behavior determining unit will determine that this object conducts an abnormal behavior.

In this embodiment, if a vehicle stops at the intersection in condition of red light, the behavior of the vehicle is regarded as normal; if the vehicle precedes straight or turning right during red light phase, the vehicle's behavior is regard as abnormal, and the abnormal event is detected. If the vehicle turns left in condition of red light, its behavior is regarded as abnormal since its not fit with the any normal behavior model, as a result, the detection of traffic violation (e.g. red light running) is achieved by abnormal behavior detection. The application in detecting red light running is merely an instance, and the claimed method can also be adapted to detect various object behaviors under other traffic situations by establishing other behavior models.

Figure 6:
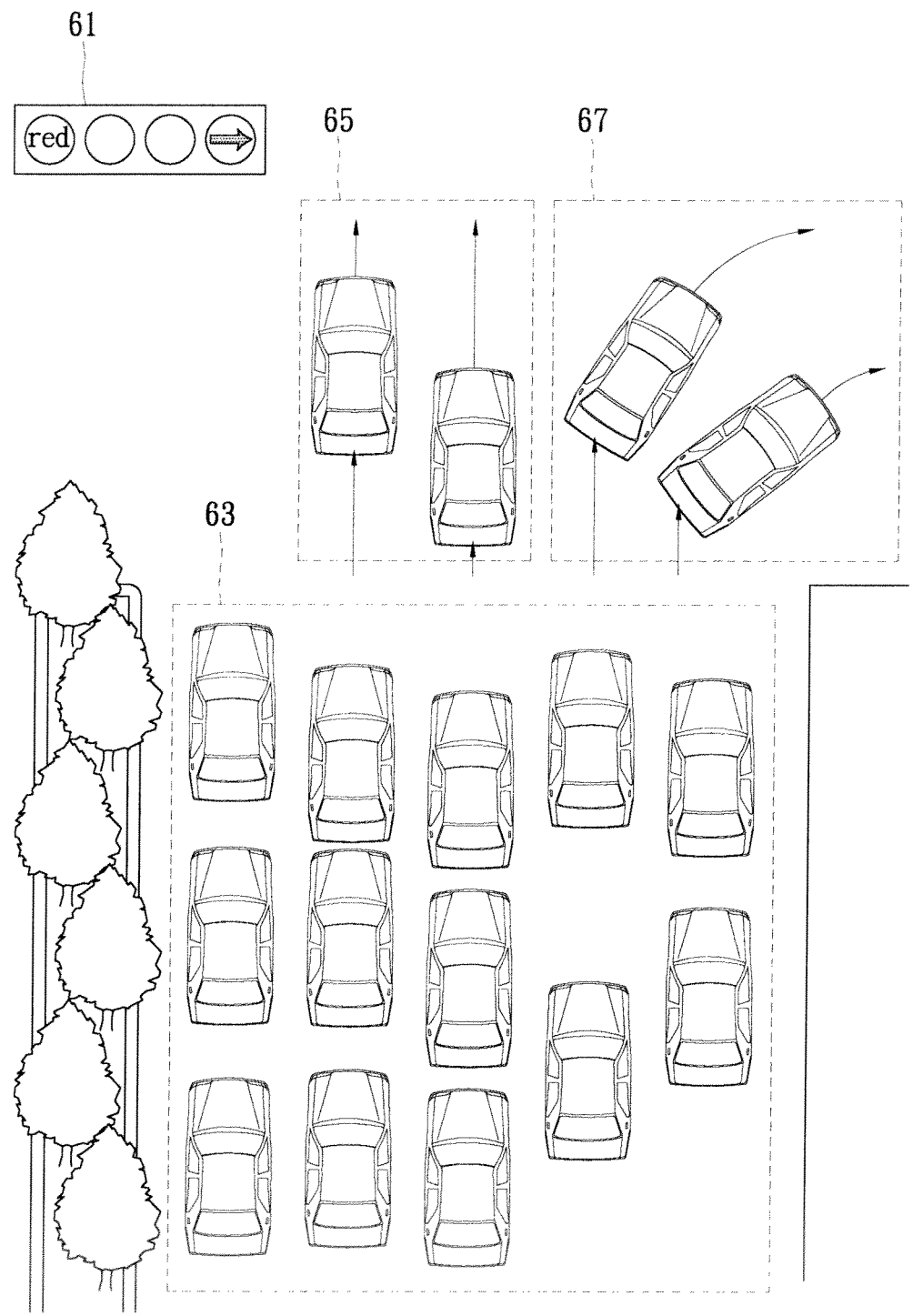
FIG. 6 schematically shows a diagram of detection of red light running in another embodiment of the present invention.

Reference is made to FIG. 6 illustrating another embodiment of red light running detection by the claimed system. In the example, traffic signal 61 with at least four statuses (i.e. red, yellow, green, right-turn green arrow) is located over an intersection. Right turning traffic is allowed under the status that both red-light and right-turn-green-arrow are lighted, but the traffic in the straight or left-turn is prohibited. Therefore, any vehicle proceeds straight or makes a left turn is regarded is as a red light violation event and the right turn behavior is regard as a legal behavior other than red light violation.

In FIG. 6, it shows the clustering result in condition of both the red light and the right-turn green arrow are lighted, namely the status of the traffic signal extracted by the feature extraction unit is "red and right-turn green arrow". The clustering result includes three groups, the fourth group (63) "the vehicle stops behind the intersection while the signal status is red light and right-turn green arrow", the fifth group (65) "the vehicle proceeds straight while the signal status is red and right-turn green arrow" and the sixth group (67) "the vehicle turning right while the signal status is red and right-turn green arrow". Based on the cluster analysis, the behavior model establishing unit establishes a new behavior model or continuously updates the existing ones over the learning process. In this embodiment, since the probability of the sixth group (67) is low, it is regard as illegal behavior even though the traffic law allows right turn traffic while the status of the traffic signal is "red and right turn green arrow".

In order to avoid misclassify normal behaviors which have low probability as abnormal behaviors. A supervised learning scheme is introduced to the behavior model establishing unit for clearly defining normal and abnormal behaviors. Users define a group of (normal/abnormal) behaviors by setting supervised classification parameters, thus the associated (normal/abnormal) behavior models can be established supervised.

In this embodiment, if a vehicle stops behind the intersection when the right-turn green arrow shows with red light, this vehicle's behavior is regarded as normal. If a vehicle proceeds straight or turns left under above condition, the vehicle's behavior is regard as abnormal and its abnormal behavior will be detected by the behavior determining unit. If a vehicle turns right in above condition, its feature set will fit with normal behavior model and its behavior will be regard as normal by the behavior determining unit, since the misclassification problem had been solved by introduce the supervised classification parameters. Therefore, the fourth group (63) and the sixth group (67) are both regard as normal behaviors, and only the fifth group (65) is regard as an abnormal behavior.

The implementation may not be limited to the above situation. In practice, the claimed method is also adapted under complex traffic regulation system by establishing the associated normal and abnormal behavior models.

Figure 7:
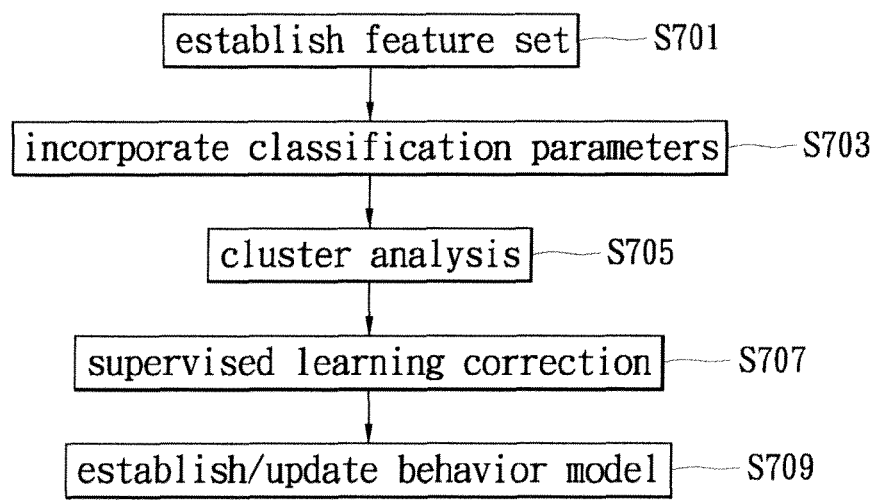
FIG. 7 illustrates a work flow of supervised learning scheme of one embodiment in accordance with the present invention.

Further reference is made to FIG. 7, which relates to the introduction of supervised classification parameter into the learning scheme during the process of establishing and updating the behavior models.

Initially, as in the step S701, the features are extracted from the incoming monitoring data and those associated feature sets used in behavior classification are established. Next, in step S703, the supervised classification parameters are incorporated into the system according to requirement.

In the feature cluster analysis step (step S705). The plurality of object behaviors could be classified into a plurality of groups, and then the type of each group can be corrected based on the supervised classification parameters (step S707) (i.e. set the specific group as normal or abnormal). Finally, the classification result is used to establish a new behavior model or to update the existing one. (Step S709).

The method described above is applicable to various behaviors detection. The claimed system can be used to detect various traffic violations besides red light violation, such as "driving in the wrong lane" and "wrong-way driving". For example, in "driving in the wrong lane" detection, the features such as vehicle's trajectory and the vehicle type are extracted by the feature extraction unit and further grouped into a feature set, and then the behavior model establishing unit performs a cluster analysis and establishes one or more behavior models. Finally, the behavior determining unit determines the presence of an abnormal behavior.

In one embodiment, the clustering process may establish several groups, such as group A represents a car driving in lane 1, group B represents a scooter riding in lane 1, group C represents a car driving in lane 2, and group D represents a scooter riding in lane 2. Furthermore, lane 1 represents fast traffic lane where any scooter is prohibited, and lane 2 represents slow traffic lane allowed for both car and scooter. The claimed detection system uses an unsupervised learning method to establish normal/abnormal behavior models, the information from groups A, C and D is used to establish the normal behavior model and information from Group B is use to establish the abnormal behavior model. Furthermore, the system may incorporate a supervised learning scheme, directly set the group B as traffic violation that need to be detected. Under the supervised learning scheme, each of group A, C and D is contributed to a normal behavior model, while group B is contributed to an abnormal behavior model.

For example, when a scooter riding in the scooter-prohibited fast traffic lane, the system can detect that it is a traffic violation event.

The claimed system has following advantages over conventional system:

1. The system can automatically recognize the normal and abnormal behavior through an unsupervised learning process even under complex traffic regulation system or being applied in various environments.

2. The system is applicable to various abnormal behaviors detection by extracting multiple various features.

To summarize present invention, the instance disclosure performs abnormal behavior detection by a two-category classification method based on multiple features. The classification procedure comprises the steps of: extracting the features to generate the feature sets associated with each object, cluster analysis, establishing the (normal/abnormal) behaviors models, and detecting abnormal behavior based on these models.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation. The scope of the invention is therefore defined solely by the appended claims.

The invention claimed is:

1. A non-transitory computer storage medium storing a behavior detection program using an automatic classification of multiple features, comprising:

extracting a set of features associated with each of a plurality of objects respectively from monitoring data;

establishing at least one behavioral model for classifying at least one behavior type of objects after a cluster analysis based on similarities among the separated sets of features;

determining a behavior type of an object according to an extracted set of features of said object and the at least one behavior model; and outputting the determined behavior type of the said object.

2. The non-transitory computer storage medium of claim 1, wherein the set of features further comprises: spatial information extracted by a spatial feature extraction module and temporal information extracted by a temporal feature extraction module.

3. The non-transitory computer storage medium of claim 2, wherein the behavior detection program is applied to detect a traffic violation, and the spatial feature extraction module comprises: a traffic signal status detection subunit, for obtaining the status of the traffic signal by an image analysis process; and a vehicle position detection subunit, for obtaining one or more positions of one or more vehicles through the image analysis process.

4. The non-transitory computer storage medium of claim 2, wherein the behavior detection program is applied to detect the traffic violation, and the spatial feature extraction module comprises a vehicle type detection subunit for detecting the type of each vehicle by an image analysis technique.

5. The non-transitory computer storage medium of claim 2, wherein the behavior detection program is applied to detect the traffic violation, and the temporal feature extraction module comprises a vehicle tracking subunit for obtaining position distribution of one or more vehicles along a continuous timeline and the track of each vehicle.

6. The non-transitory computer storage medium of claim 1, wherein the monitoring data is received from each of a plurality of sensors distributed in the monitoring environment.

7. The non-transitory computer storage medium of claim 1, wherein the outputting comprises at least one of a storage device, a display and a transmitter.

8. A behavior detection method which performs automatic classification based on multiple features, comprising:

extracting a set of features associated with each of a plurality of objects respectively from the monitoring data;

performing a cluster analysis based on similarities among the separated sets of features;

establishing at least one behavior model for classifying at least one behavior type of objects based on the result of the cluster analysis;

determining a behavior type of an object according to an extracted set of features of said object and the at least one behavior model; and outputting the determined behavior of the said object.

9. The method of claim 8, wherein the set of features of an object includes both spatial and temporal information.

10. The method of claim 8, wherein performing the cluster analysis comprises grouping objects that have similar environmental features, trajectory, or object features.

11. The method of claim 8, wherein the monitoring data is extracted from each of a plurality of sensors distributed in the monitoring environment.

12. The method of claim 11, wherein the monitoring data includes a road monitoring image and the status of a traffic signal.

13. The method of claim 8, wherein establishing the at least one behavior model comprises using a supervised learning scheme to define a behavior type as an abnormal behavior.

14. The method of claim 8, wherein the behavior type of each of the plurality of the objects comprises a normal behavior and an abnormal behavior, and the at least one behavior mode comprises a normal behavior model, wherein the behavior type of the said object is regarded as normal, if the extracted set of features of the said object fits the normal behavior model; and the behavior type of the said object is regarded as abnormal, if the extracted set of features of the said object does not fit any normal behavior model.

15. The method of claim 8, wherein performing the cluster analysis further comprises dividing the plurality of objects into a plurality of groups, wherein each group has a similar set of features; and the behavior model of each group is established based on the probability of the group among the plurality of groups.

16. The non-transitory computer storage medium of claim 1, wherein the set of features associated with the object comprises an object feature and an environmental feature which is extracted from where the object is in.

17. The method of claim 8, wherein the set of features associated with the object comprises an object feature and an environmental feature which is extracted from where the object is in.

* * * * *